(12) United States Patent
Tojo et al.

(10) Patent No.: US 9,366,550 B2
(45) Date of Patent: Jun. 14, 2016

(54) OPTICAL ENCODER HAVING A SCALE COMPRISING A LIGHT GUIDING PORTION WITH REFLECTION SURFACES AND A LIGHT GUIDING FUNCTION

(75) Inventors: Ryo Tojo, Hachioji (JP); Eiji Yamamoto, Musashimurayama (JP)

(73) Assignee: OLYMPUS CORPORATION, Tokyo (JP)

( * ) Notice: Subject to any disclaimer, the term of this patent is extended or adjusted under 35 U.S.C. 154(b) by 217 days.

(21) Appl. No.: 13/611,751

(22) Filed: Sep. 12, 2012

(65) Prior Publication Data

US 2013/0001411 A1 Jan. 3, 2013

Related U.S. Application Data

(63) Continuation of application No. PCT/JP2011/055309, filed on Mar. 8, 2011.

(30) Foreign Application Priority Data

Mar. 15, 2010 (JP) .................................. 2010-058218

(51) Int. Cl.
*G01D 5/347* (2006.01)
*G01D 5/38* (2006.01)
*G01D 5/244* (2006.01)

(52) U.S. Cl.
CPC ........ *G01D 5/34746* (2013.01); *G01D 5/24428* (2013.01); *G01D 5/34723* (2013.01); *G01D 5/38* (2013.01)

(58) Field of Classification Search
CPC ......... G01J 1/04; G01J 1/0271; G01J 1/0459; G01D 5/268; G01D 5/2451–5/2458; G01D 5/2497; G01D 5/345–5/34792; G02B 6/4202; G02B 6/4249; G02B 27/0172; G02B 27/0101; G02B 27/01; G02B 2027/01; G02B 2027/0178; G02B 6/0011–6/0063; G02B 6/0085; B62D 15/02; G62D 15/0215
USPC .................. 250/227.11, 231.13–231.19, 239; 341/11, 13
See application file for complete search history.

(56) References Cited

U.S. PATENT DOCUMENTS 3,491,245 A * 1/1970 Hardesty .................. 250/227.11
3,731,107 A * 5/1973 Goodwin et al. ........ 250/227.31
(Continued)

FOREIGN PATENT DOCUMENTS

DE 10242169 C1 * 11/2003 ............. G01B 11/26
JP 59-194302 11/1984
(Continued)

OTHER PUBLICATIONS

International Preliminary Report on Patentability together with the Written Opinion PCT/JP2011/055309 dated Nov. 1, 2012.
(Continued)

*Primary Examiner* — Que T Le
(74) *Attorney, Agent, or Firm* — Scully, Scott, Murphy & Presser, P.C.

(57) ABSTRACT

An optical encoder includes a light projecting portion, a light receiving portion, and a scale arranged between the light projecting portion and the light receiving portion. The scale includes a light guiding portion which allows light to transmit therethrough and has a light guiding function of guiding at least a part of the light projected by the light projecting portion in a direction perpendicular to a thickness direction thereof through the light guiding portion. The light receiving portion receives the light guided by the scale and relatively moves with respect to the scale.

16 Claims, 7 Drawing Sheets

(56) References Cited

U.S. PATENT DOCUMENTS

| | | | |
|---|---|---|---|
| 5,774,219 A | 6/1998 | Matsuura | |
| 6,526,190 B2* | 2/2003 | Holzapfel et al. | 385/12 |
| 6,906,315 B2* | 6/2005 | Tobiason | 250/237 R |
| 8,546,745 B2* | 10/2013 | Lippuner | 250/231.13 |
| 2009/0108188 A1* | 4/2009 | Urabe | 250/231.1 |
| 2011/0044073 A1* | 2/2011 | Gourlay | 362/607 |

FOREIGN PATENT DOCUMENTS

| | | |
|---|---|---|
| JP | 61-124822 | 6/1986 |
| JP | 09-196706 | 7/1997 |
| JP | 2006-84448 A | 3/2006 |
| JP | 2006-330492 | 12/2006 |
| JP | 2008-82958 | 4/2008 |
| JP | 2008-256641 | 10/2008 |

OTHER PUBLICATIONS

International Search Report dated Jun. 7, 2011 issued in PCT/JP2011/055309.

Japanese Decision of Rejection dated May 26, 2015 received from Application No. 2012-505623, together with an English-language translation.

* cited by examiner

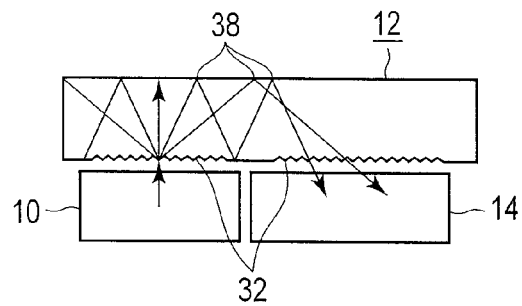
F I G. 7
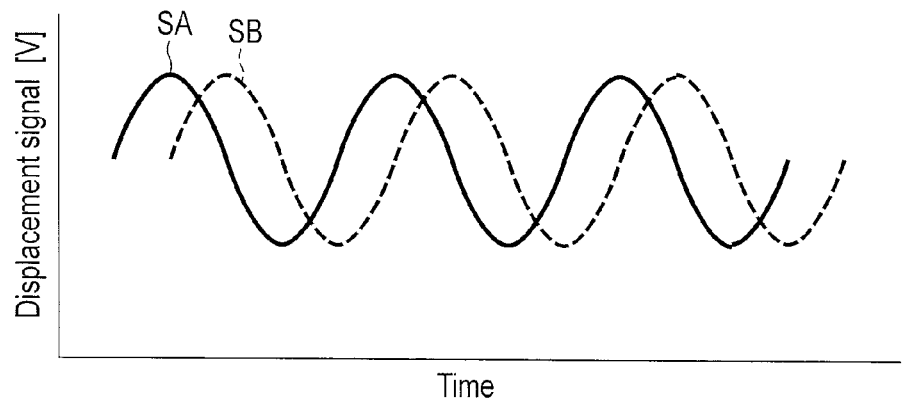
F I G. 8
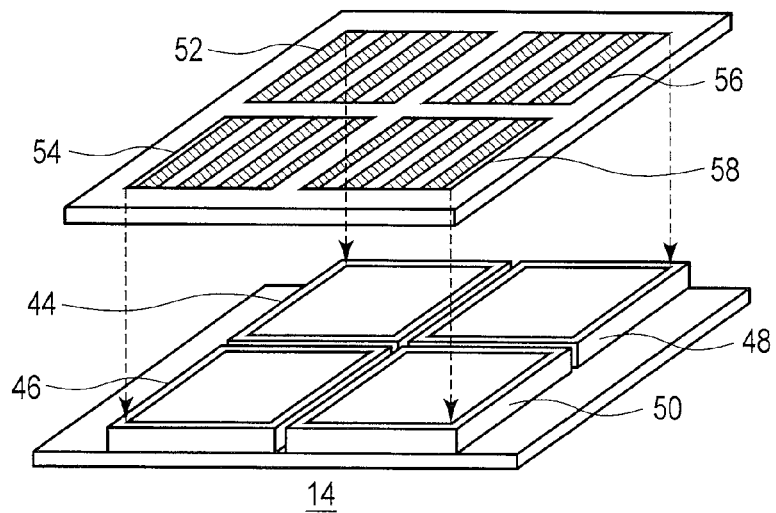
F I G. 9

US 9,366,550 B2

OPTICAL ENCODER HAVING A SCALE COMPRISING A LIGHT GUIDING PORTION WITH REFLECTION SURFACES AND A LIGHT GUIDING FUNCTION

CROSS REFERENCE TO RELATED APPLICATIONS

This application is a Continuation Application of PCT Application No. PCT/JP2011/055309, filed Mar. 8, 2011 and based upon and claiming the benefit of priority from prior Japanese Patent Application No. 2010-058218, filed Mar. 15, 2010, the entire contents of all of which are incorporated herein by reference.

BACKGROUND OF THE INVENTION

1. Field of the Invention

The present invention relates to an optical encoder for use in, e.g., a displacement sensor.

2. Description of the Related Art

A Talbot encoder or a triple grating encoder is known as a detector that can detect a position or an angle using a small and relatively simple configuration.

For example, as disclosed in Specification of U.S. Pat. No. 5,774,219 (FIG. 1 and FIG. 2), the triple grating encoder is constituted of a light source, a transmissive light source scale, a main scale, and a photodiode array for light receiving elements. The main scale is disposed on a measurement target that is relatively displaced with respect to the light source, the light source scale, and the photodiode array. Further, a fixed interval is provided between the pair of the light source scale and the photodiode array and the main scale as a position at which an interference pattern is coupled.

Light emitted from the light source passes through the light source scale, and it is reflected by the main scale. The reflected light couples the interference pattern on a photodiode array surface. The light source, the pair of the light source scale and the photodiode array, and the main scale relatively move. With this movement, the interference pattern coupled with the photodiode array changes. Therefore, a relative position can be detected from a change in interference pattern. Therefore, high-resolution displacement measurement is carried out.

The Talbot encoder or the triple grating encoder has advantages, e.g., a good accuracy as compared with encoders adopting other systems. However, light from the light source must be reflected or transmitted by the scale, and the light must be received at the position where the interference pattern is coupled. Therefore, arrangement of each of the light emission points of the light source or the like or a light projecting portion including an exit region, the scale, and a light receiving portion including a light receiving region of the light receiving element and the like is restricted. That is, the Talbot encoder or the triple grating encoder has a problem that a degree of freedom in arrangement of the light projecting portion, the scale, and the light receiving portion is lowered.

When the degree of freedom in arrangement of the light projecting portion, the scale, and the light receiving portion is low in this manner, intervals between the scale, the light projecting portion, and the light receiving portion cannot be narrowed, for example. Therefore, this matter leads to a problem that the encoder cannot be further thinned.

BRIEF SUMMARY OF THE INVENTION

In view of the above-described problems, it is an object of the present invention to provide an optical encoder having a high degree of freedom in arrangement of a light projecting portion, a scale, and a light receiving portion.

According to an aspect of embodiments, an optical encoder includes a light projecting portion; a light receiving portion; and a scale arranged between the light projecting portion and the light receiving portion, wherein the scale comprises a light guiding portion which allows light to transmit therethrough and has a light guiding function of guiding at least a part of the light projected by the light projecting portion in a direction perpendicular to the thickness direction thereof through the light guiding portion, and the light receiving portion receives the light guided by the scale and relatively moves with respect to the scale.

According to the present invention, when the scale has the light guiding function, it is possible to provide the optical encoder having a high degree of freedom in arrangement of the light projecting portion, the scale, and the light receiving portion.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 7 is a view showing a further example of the cross section of the scale, the light projecting portion, and the light receiving portion in the optical encoder according to the first embodiment;

FIG. 8 is a view showing an example of output waveforms from the light receiving portion in the optical encoder according to the first embodiment;

FIG. 9 is a view showing a modification of the light receiving portion in the optical encoder according to the first embodiment;

DETAILED DESCRIPTION OF THE INVENTION

Modes for carrying out the present invention will now be described hereinafter with reference to the accompanying drawings.

First Embodiment

Figure 1:
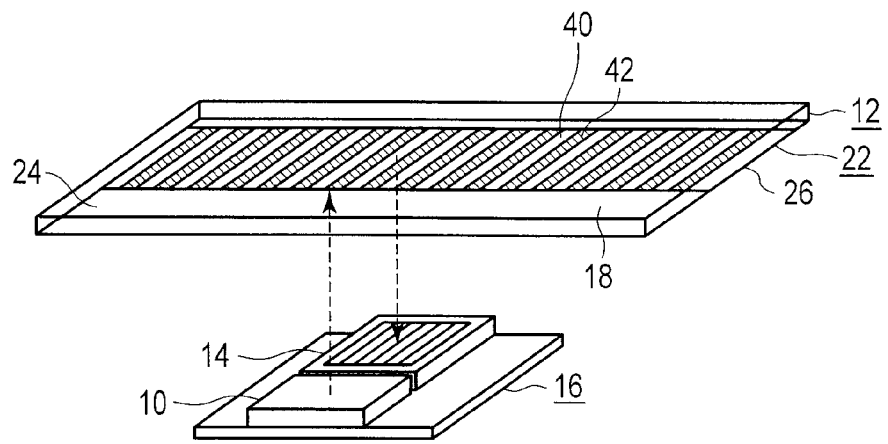
FIG. 1 is a perspective view showing an entire configuration of an optical encoder according to a first embodiment of the present invention.

As shown in FIG. 1, an optical encoder according to a first embodiment of the present invention is constituted of a light projecting portion 10, a scale 12 which is relatively displaced with respect to the light projecting portion 10, and a light receiving portion 14 configured to detect light that is projected from the light projecting portion 10 through the scale 12. The light projecting portion 10 and the light receiving portion 14 are arranged on a head 16. Here, although not shown, a fixed body and movable body that relatively move are present. The head 16 is disposed on the fixed body, and the scale 12 is disposed on the movable body.

The light projecting portion 10 may be a light source itself formed of, e.g., a light emitting diode (an LED) or a laser diode (an LD), or it may be a portion that projects light from the light source at a position different from the light source using, e.g., an optical fiber. In this first embodiment, the light projecting portion 10 is assumed to be a light emitting element such as an LED or an LD. The projecting portion 10 is disposed in such a manner that a light projecting surface thereof is in contact with or in proximity to a light incidence portion 18 included in the scale 12. It is to be noted that the light projecting surface of the light projecting portion 10 is separated from the scale 12 in FIG. 1 for the purpose of illustration. The light projecting portion 10 projects light toward the light incidence portion 18 of the scale 12.

It is to be noted that light emitted from the light projecting portion 10 is diverging light in this embodiment.

Figure 2:
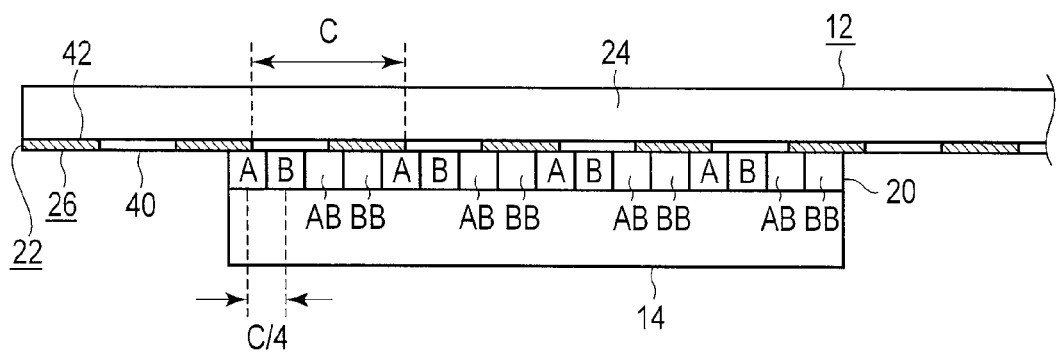
FIG. 2 is a cross-sectional view for explaining a relationship between a scale and a photodiode array of the optical encoder according to the first embodiment.

The light receiving portion 14 may be a photodiode (a PO) itself, or it may be a portion which receives light at a position different from the PO using, e.g., an optical fiber. In this first embodiment, the light receiving portion 14 is assumed to be a PD. As shown in FIG. 2, the light receiving portion 14 comprises a PO array 20 as a light receiving element. This PO array 20 is disposed in such a manner that a light receiving surface of the PO array 20 is in contact with or in proximity to a light exit portion 22 of the scale 12. It is to be noted that the light receiving surface of the light receiving portion 14 (the PO array 20) is separated from the scale 12 in FIG. 1 for the purpose of illustration. Furthermore, the light receiving portion 14 is placed at a predetermined distance from the light projecting portion 10 on the same side of the light projecting portion 10 with respect to the scale 12 in a direction perpendicular vertical to a measurement direction of a relative position and also perpendicular vertical to the thickness direction of the scale 12. In the PD array 20, for example, four types of rectangular photodiodes A, B, AB, and BB are combined. The respective photodiodes A, B, AB, and BB are arranged in a comb-like pattern at every ¼ (C/4) of a cycle of the scale, i.e., at every 90°.

Moreover, the light projecting surface of the light projecting portion 10 and the light receiving surface of the light receiving portion 14 are arranged to be placed on the same plane.

The scale 12 is formed of a transparent plate-like member made of, e.g., glass. The scale 12 is disposed on the non-illustrated movable body in parallel to the light projecting surface of the light projecting portion 10 and the light receiving surface of the light receiving portion 14. The scale 12 is constituted of at least three portions, i.e., the light incidence portion 18 representing a scale surface to which light enters, the light exit portion 22 representing a scale surface from which the light exits, and a light guiding portion 24 representing a material and a space present in the range that the light which has entered from the light incidence portion 18 is led to the light exit portion 22. Additionally, scale-side transmission slits 26 are formed in the light exit portion 22.

A surface of the scale 12 facing the light projecting portion 10 is arranged in contact with the light projecting portion 10 or in proximity to the light projecting portion 10. The light incidence portion 18 is provided on this surface of the scale 12 facing the light projecting portion 10. The light incidence portion 18 represents the entire range in which light from the light projecting portion 10 is assumed to enter on the surface of the scale 12 when a relative position of the light projecting portion 10 and the scale 12 is changed. Therefore, the light incidence portion 18 has a length substantially equivalent to the measurement range in the measurement direction of the relative position. The light projected from the light projecting portion 10 enters the scale 12 from this light incidence portion 18. However, in actual use, a position from which the light does not enter the light incidence portion 18 may be present.

Figure 3:
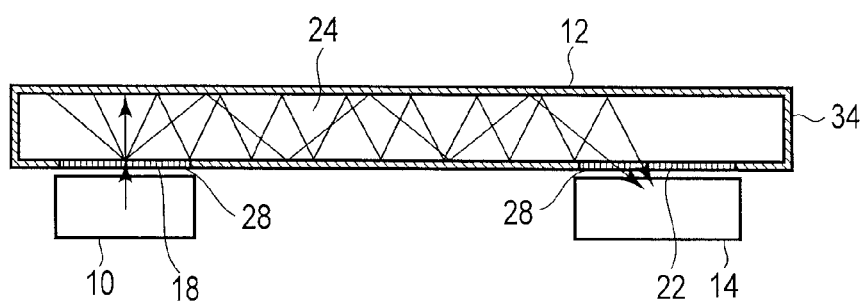
FIG. 3 is a view showing an example of a cross section of the scale, a light projecting portion, and a light receiving portion in the optical encoder according to the first embodiment.

In the light incidence portion 18, a part of the light from the light projecting portion 10 again exits from the light incidence portion 18. That is because there occurs a phenomenon that a part of the light from the light projecting portion 10 travels toward any other portion than the light incidence portion 18, it is reflected on the surface of the scale 12 without entering, or the incident light is reflected on the surface of the scale 12 opposite to the surface of the light incidence portion 18. Occurrence of such a phenomenon may deteriorate incidence efficiency in some cases. Therefore, in this embodiment, the light projecting portion 10 and the light incidence portion 18 are arranged to be in contact with or in proximity to each other so that a major part of the light from the light projecting portion 10 is projected onto the light incidence portion 18. Further, to enhance incidence efficiency, an antireflection film 28 is formed on the surface of the scale 12 as shown in FIG. 3.

It is to be noted that there is a method other than forming the above-described antireflection film 28.

Figure 4:
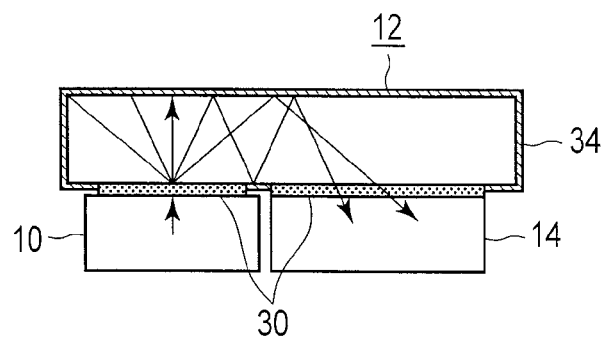
FIG. 4 is a view showing another example of the cross section of the scale, the light projecting portion, and the light receiving portion in the optical encoder according to the first embodiment.

For example, as shown in FIG. 4, matching oil 30 as a matching member having a refractive index equivalent to those of the light projecting portion 10 and the scale 12 may be applied between the light projecting portion 10 and the light incidence portion 18 of the scale 12. When such a configuration is adopted, reflection caused due to a difference in refractive index of the surface of the scale 12 can be reduced.

When the antireflection film 28 or the matching oil 30 is arranged in this manner, light that is reflected on the surface of the scale 12 can be reduced, and entering light can be increased.

Figure 5:
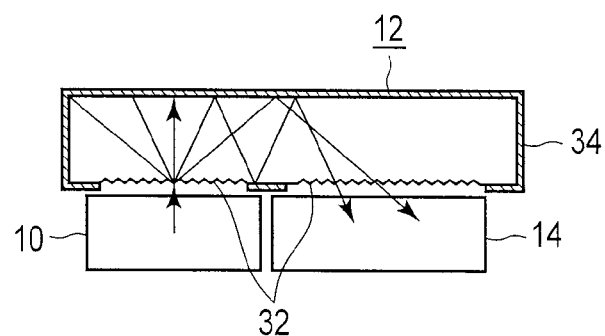
FIG. 5 is a view showing still another example of the cross section of the scale, the light projecting portion, and the light receiving portion in the optical encoder according to the first embodiment.

Alternatively, as shown in FIG. 5, the light incidence portion 18 on the surface of the scale 12 may be subjected to surface roughening to obtain a rough surface 32. When the light incidence portion 18 is roughened, light that has entered the scale 12 diffuses. As a result, the light that enters from the light incidence portion 18, is reflected on the surface of the scale 12 opposite to the surface of the light incidence portion 18, and again exits from the light incidence portion 18 can be reduced, and the light that travels toward the light exit portion 22 can be increased. It is to be noted that, when the surface of the scale 12 is flat, reflection is facilitated if the incidence light has a large incidence angle, but roughening the light incidence portion 18 on the surface of the scale 12 enables reducing reflection in such a situation.

As described above, for example, the light projecting portion 10 is arranged to be in contact with or in proximity to the light incidence portion 18 of the scale 12, the antireflection film 28 is formed on or the matching oil 30 is applied to the light incidence portion 18, or the light incidence portion 18 is subjected to surface roughening. When such an operation is performed, the light incidence portion 18 can have a function of improving the light incidence efficiency which is one of light transmission efficiency improving functions for efficiently transmitting light from the light projecting portion 10 to the light receiving portion 14.

As shown in FIG. 3, a reflection member 34 having a high reflectance ratio such as an aluminum film is provided on a glass surface other than the light incidence portion 18 and the light exit portion 22 of the scale 12 toward the inner side of the scale 12, thereby constituting the light guiding portion 24. It is to be noted that the light guiding portion 24 represents materials and a space that are present in the range through which the light that has entered from the light incidence portion 18 is led to the light exit portion 22. In this first embodiment, the light guiding portion 24 designates the inside of the scale through which the light that has entered from the light incidence portion 18 is led to the light exit portion 22. The light that has entered the scale 12 from the light incidence portion 18 is reflected in the scale 12 by the reflection member 34 provided on the surface of this scale 12, and at least a part of this light is led to the light exit portion 22. Here, as different from the regular optical design, a specific light path is not assumed between the light incidence portion 18 and the light exit portion 22, or light paths are assumed to be simultaneously present. Therefore, as the reflection in the scale 12, multiple reflection including single reflection is mainly assured. As the multiple reflection, it is assumed that a specific number of times, which is not less than one, reflection occurs for the multiple reflections and it is also assumed that different numbers of times, which are not less than one, of reflection also can occur at the same time. As the reflection contributing to detection, a specific number of times of reflection, e.g., one reflection may have high gravity. Further, a specific light path is not assured as a light transmission distance for the light guiding portion 24 is increased, and design targeting a configuration/arrangement that enables transmission of the light from the determined light incidence portion 18 to the light exit portion 22 is carried out.

It is to be noted that the reflection member 34 is homogeneously provided on the glass substrate in such a manner that the reflectance ratio becomes fixed, and it is provided as a parallel plate in a direction extending from the light incidence portion 18 to the light exit portion 22.

Figure 6:
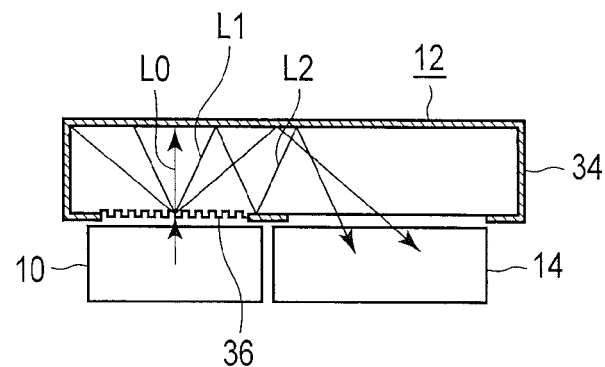
FIG. 6 is a view showing yet another example of the cross section of the scale, the light projecting portion, and the light receiving portion in the optical encoder according to the first embodiment.

Further, to enhance the light guiding efficiency, as shown in FIG. 6, a diffraction grating 36 may be provided to the light incidence portion 18. A space of the diffraction grating 36 of the light incidence portion 18 can determine a refraction angle of the light that enters the scale 12. Selecting an appropriate grating space enables designing a light path through which the light is efficiently guided from the light incidence portion 18 to the light exit portion 22. It is to be noted that, in FIG. 6, L0 denotes zero-order light; L1, primary light; and L2, secondary light.

As described above, for example, the reflection member 34 having the high reflectance ratio is provided on the surface of the scale 12, or the diffraction grating 36 is provided to the light incidence portion 18 and the light path is designed, whereby the scale 12 has a function of improving the light guiding efficiency which is one of the light transmission efficiency improving functions.

Furthermore, as shown in FIG. 7, the light may be guided in the scale 12 based on total reflection 38 that occurs due to a difference in diffractive index between the scale 12 and air.

On the surface of the scale 12 on the light receiving portion 14 side, the light exit portion 22 is provided with a length substantially equivalent to the measurement range in the relative position measurement direction at a position different from the light incidence portion 18. The scale-side transmission slits 26 are provided in the light exit portion 22. The scale-side transmission slits 26 form a rectangular pattern having the same fixed cycle as the PD array 20 with respect to the relative movement direction of the fixed body and the movable body by using light transmitting portions 40 and light shielding portions 42. It is to be noted that the light exit portion 22 represents the entire range in which the light from the scale 12 including a portion shielded by the light shielding portion 42 is assumed to be emitted toward the light receiving portion 14 when the relative position of the scale 12 and the light receiving portion 14 is changed. At this time, the light guided to the light exit portion 22 is allowed to exit from the light exit portion 22 to the light receiving portion 14 via the scale-side transmission slits 26. However, in actual use, a position at which the light does not exit from the light exit portion 22 may be present.

In the light exit portion 22, when a part of the light exiting from the light exit portion 22 travels toward a portion other than the light receiving portion 14 or a part of the light guided by the light guiding portion 24 is reflected on the surface of the scale 12 and does not exit, the exit efficiency may be deteriorated in some cases. Therefore, the light exit portion 22 and the light receiving portion 14 are arranged to be in contact with or in proximity to each other so that a major part of the light from the light exit portion 22 exits toward the light receiving portion 14. Further, to enhance the exit efficiency, in this embodiment, as shown in FIG. 3, the antireflection film 28 is formed on the surface of the scale 12.

It is to be noted that, to enhance the exit efficiency, there is a method other than forming the above-described antireflection film 28.

For example, as shown in FIG. 4, the matching oil 30 as a matching member having a refractive index equivalent to those of the scale 12 and the light receiving element may be applied between the light exit portion 22 and the light receiving element of the light receiving portion 14. When such a configuration is adopted, reflection caused due to a difference in refractive index of the surface of the scale 12 can be reduced.

When the antireflection film 28 or the matching oil 30 is arranged in this manner, the light that is reflected on the surface of the scale 12 can be reduced, and the exiting light can be increased.

Moreover, when the surface of the scale 12 is flat, reflection is facilitated if the light traveling toward the light exit portion 22 has a large angle. Therefore, as shown in FIG. 5, the light incidence portion 18 on the surface of the scale 12 is roughened to obtain the rough surface 32. When such a configuration is adopted, reflection in a case where the light traveling toward the light exit portion 22 has a large angle can be reduced.

As described above, for example, the light exit portion 22 is arranged to be in contact with or in proximity to the light receiving portion 14, the antireflection film 28 is formed on or the matching oil 30 is applied to the light exit portion 22, or the light exit portion 22 is subjected to surface roughening. When such an operation is performed, the light exit portion 22 can have a function of improving the light exit efficiency which is one of the light transmission efficiency improving functions for efficiently transmitting light from the light projecting portion 10 to the light receiving portion 14.

Only if a desired amount of detection light can be assured by such an improvement in light transmission efficiency, the arrangement of the light incidence portion 18 or the light exit portion 22 can be freely determined, and the arrangement can be easily changed. As compared with the conventional optical design using a determined light path, a degree of freedom in design of the optical arrangement can be improved.

The light projecting portion 10 projects the light toward the light incidence portion 18 of the scale 12. The light from the light projecting portion 10 enters the light incidence portion 18. The light guiding portion 24 guides at least a part of the light to the light exit portion 22 based on the single reflection or the multiple reflection using the reflection surface thereof (the reflection member 34). The light exit portion 22 allows the light guided by the light guiding portion 24 to exit therefrom toward the light receiving portion 14. The light receiving portion 14 receives the light exiting from the light exiting portion 22. With the above-described configuration, an axis of the light from the light projecting portion 10 can be moved through the scale 12.

Here, when the scale-side transmission slits 26 disposed on the mobile body relatively moves with respect to the PD array 20 disposed on the fixed body, an amount of the light detected by the PD array 20 fluctuates. As shown in FIG. 8, pseudo-sinusoidal signals whose phases are 90° different from each other are obtained from the photodiodes A, B, AB, and BB. It is to be noted that FIG. 8 shows two signals having 90° different phases (a phase A signal SA and a phase B signal SB) of these signals. Based on a change in the pseudo-sinusoidal signals, an amount of relative movement and a displacement direction of the fixed body and the movable body can be detected.

Alternatively, as shown in FIG. 9, the light receiving portion 14 may be a combination of first to fourth light receiving elements (PD) 44, 46, 48, and 50 and first to fourth head-side transmission slits 52, 54, 56, and 58 provided in one member. The first to fourth head-side transmission slits 52 to 58 are formed in light receiving surfaces of the first to fourth light receiving elements 44 to 50. It is to be noted that FIG. 9 shows a state that the first to fourth light receiving elements 44 to 50 are separated from the first to fourth head-side transmission slits 52 to 58 for the purpose of illustration. The first to fourth head-side transmission slits 52 to 58 are formed of the rectangular light shielding portions 42 and the light transmitting portions 40 at the same interval and in the same direction as the scale-side transmission slits 26, and they have phases that are 90° different from each other. An amount of light received by each of the first to fourth light receiving elements 44 to 50 changes in accordance with a positional relationship between the scale-side transmission slits 26 of the scale 12 and the first to fourth head-side transmission slits 52 to 58, and pseudo-sinusoidal signals having phases 90° different from each other can be obtained from the first to fourth light receiving elements 44 to 50. It is to be noted that FIG. 8 shows two signals (the phase A signal SA and the phase B signal SB) of these signals. Based on a change in the pseudo-sinusoidal signals, an amount of relative movement and a displacement direction of the fixed body and the movable body can be detected.

According to the optical encoder of the first embodiment of the present invention, the scale 12 has the light incidence portion 18, the light guiding portion 24, and the light exit portion 22. When such a configuration is adopted, in regard to the light that has been projected by the light projecting portion 10 and has entered the light incidence portion 18, the light axis is moved through the scale 12, and this light can exit from the light exit portion 22. Consequently, as different from the conventional example, it is no longer necessary to arrange the light projecting portion and the light receiving portion with respect to the scale in such a manner that the light projected from the light projecting portion is reflected by the scale and the light receiving portion is placed at the position where coupling is performed. That is, in this embodiment, since the positions of the light projecting portion 10 and the light receiving portion 14 can be arbitrarily determined in the range that the scale 12 can guide the light, the degree of freedom in design can be increased.

Additionally, when the light projecting portion 10, the scale 12 that leads the light from the light incidence portion 18 to the light exit portion 22, and the light receiving portion 14 are constituted in such a manner that the light source, the light receiving element, and the scale 12 are in contact with or in proximity to each other, the thin encoder can be realized.

Further, since a specific light path is not assumed between the light incidence portion 18 to the light exit portion 22 or simultaneous presence of light paths is assumed, the degree of freedom in setting the positional relationship between the scale 12, the light projecting portion 10, and the light receiving portion 14 can be improved. Furthermore, even if the positional relationship deviates from a design value, a change in amount of light received by the light receiving portion 14 is smaller than that in a case where a specific light path is assumed, thereby obtaining a stable output.

Moreover, when the reflection member 34 is homogeneously provided on the glass substrate so that the reflectance ratio can be fixed and it is provided as a parallel plate in the direction extending from the light incidence portion 18 to the light exit portion 22, the light can be guided from the light incidence portion 18 to the light exit portion 22 with a stable amount of light.

Additionally, the light source and the light receiving element that require wiring of a power supply or a signal line are installed on the fixed body on the same side, and the movable body does not require wiring, and hence handling is easy.

Further, in the light guiding of the light guiding portion 24 based on the single reflection, the number of times of reflection is small, and hence a reduction in amount of light due to reflection can be suppressed. Furthermore, the light guiding based on the multiple reflection can be carried out even though the positions of the incidence portion and the exit portion are apart from each other with respect to the thickness of the scale 12.

Furthermore, since the slits are provided in the light exit portion 22, when the position of the light incidence portion 18 overlaps the position of the light exit portion 22, the light from the light projecting portion 10 enters the scale 12 through the slits. Therefore, as compared with a situation that the light enters without passing through the slits, an amount of entering light is reduced, or an amount of transmitted light becomes unstable. Therefore, as described in the first embodiment, the light projecting portion 10 is arranged in the direction perpendicular to the measurement direction with respect to the light receiving portion 14. Moreover, the light incidence portion 18 is constituted at a position with no slit with respect to the light exit portion 22 in the direction perpendicular to the measurement direction. When such a configuration is adopted, the light from the light projecting portion 10 can enter the scale 12 without passing through the slits. As a result, a reduction in amount of light can be suppressed, or an amount of light can be stabilized.

Additionally, the light passing through the slit of the scale 12 is transmitted in the scale when a component perpendicular to the thickness direction of the scale 12 is provided. Therefore, in the scale having a parallel plate shape like this example, it can be considered that light is obliquely applied to the light receiving portion 14 from the light exit portion 22. Therefore, when the light projecting portion and the light receiving portion are arranged in the same direction as the measurement direction, the light inclined in the measurement direction strikes on the light receiving portion. Therefore, a phase of a signal detected by the PD array of the light receiving portion is shifted due to a change in gap between the scale and the light receiving portion, and an error is observed in a detecting position. Therefore, as described in the first embodiment, the light projecting portion 10 is arranged in the direction perpendicular to the measurement direction with respect to the light receiving portion 14. As a result, even if the gap between the scale 12 and the light receiving portion 14 is changed, the phase of the signal detected by the PD array 20 is hardly shifted, and an error is rarely produced in the detecting position.

Further, when the light receiving portion 14 is arranged in the direction vertical to the measurement direction with respect to the light projecting portion 10, a light intensity distribution of the PD array 20 has a chevron shape with the center of the PD array 20 achieving a peak. Therefore, it is easy to apply design such as selection of a light source or setting of a shape/arrangement of the PD array that makes the light intensity distribution on the entire light receiving surface of the PD array 20 relatively uniform. Therefore, substantially equaling signal output levels of respective phases of encoder signals is facilitated. Furthermore, even when the gap between the scale 12 and the encoder head 16 fluctuates, a fluctuation of output level of the encoder signal can be readily suppressed, or the signal levels of the respective phases can be substantially equally maintained.

Moreover, for example, the light projecting portion 10 is arranged to be in contact with or in proximity to the incidence portion, the antireflection film 28 is formed on the light incidence portion 18, the matching oil 30 is applied, or the surface roughening is carried out (to obtain the rough surface 32). As a result, the light incidence portion 18 has the function of improving the light incidence efficiency which is one of the light transmission efficiency improving functions for efficiently transmitting the light from the light projecting portion 10 to the light receiving portion 14.

Additionally, the reflection member 34 with a high reflectance ratio such as an aluminum film is provided on the surface of the scale 12 excluding the light incidence portion 18 and the light exit portion 22 toward the inside of the scale 12, or the diffraction grating 36 is provided on the light incidence portion 18 to design the light path through which the light is efficiently guided from the light incidence portion 18 to the light exit portion 22. As a result, the scale 12 has the function of improving the light guiding efficiency as one of the light transmission efficiency improving functions.

Further, the light exit portion 22 is arranged in contact with or in proximity to the light receiving portion 14, the antireflection film 28 is formed on the light exit portion 22, the matching oil 30 is applied, or the surface roughening is performed (to provide the rough surface 32). As a result, the light exit portion 22 has the function of improving the light exit efficiency which is one of the light transmission efficiency improving functions for efficiently transmitting the light from the light projecting portion 10 to the light receiving portion 14.

Furthermore, since the optical encoder has the function of improving the incidence efficiency, the function of improving the light guiding efficiency, and the function of improving the exit efficiency, the light receiving portion 14 can efficiently receive the light projected from the light projecting portion 10. When an amount of light received by the light receiving portion 14 is increased, a signal amplitude for detecting a displacement is also increased, and detection with a finer resolution is enabled by dividing the signal. Alternatively, since an amount of light from the light source can be reduced, power consumption can be decreased.

It is to be noted that the description has been given as to the example where the head 16 formed of the light projecting portion 10 and the light receiving portion 14 is disposed to the fixed body and the scale 12 is disposed to the movable body but, as a matter of course, the scale 12 may be disposed to the fixed body, and the head 16 formed of the light projecting portion 10 and the light receiving portion 14 may be disposed to the movable body.

Further, the configuration of the PDs having 90° different phases has been described, but the present invention is not restricted to 90°, and any arbitrary phase difference may be used.

Furthermore, although the configuration where the slits of the scale 12 are of the transmission type has been described, a reflection type may be adopted without being restricted to the transmission type.

Moreover, the slits of the scale 12, the light incidence portion 18, the light guiding portion 24, and the light exit portion 22 do not have to be integrated, and they may be separated from each other as long as they perform the same relative movement with respect to the light receiving portion 14.

Additionally, although the example where the light projecting portion 10 and the light receiving portion 14 are integrated as the head 16 has been explained, the light projecting portion 10 may be separated from the light receiving portion 14 as long as the scale 12 is disposed to one of the fixed body or the movable body and the light receiving portion 14 is disposed to either the fixed body or the movable body which does not have the scale disposed thereto. A position of the light projecting portion 10 may be independently changed as long as the light projecting portion 10 is placed at a position where it enables light to enter the light incidence portion 18 of the scale 12.

Modifications of this first embodiment will now be described hereinafter in regard to portions different from the optical encoder according to the first embodiment.

[Modification 1]

Figure 10:
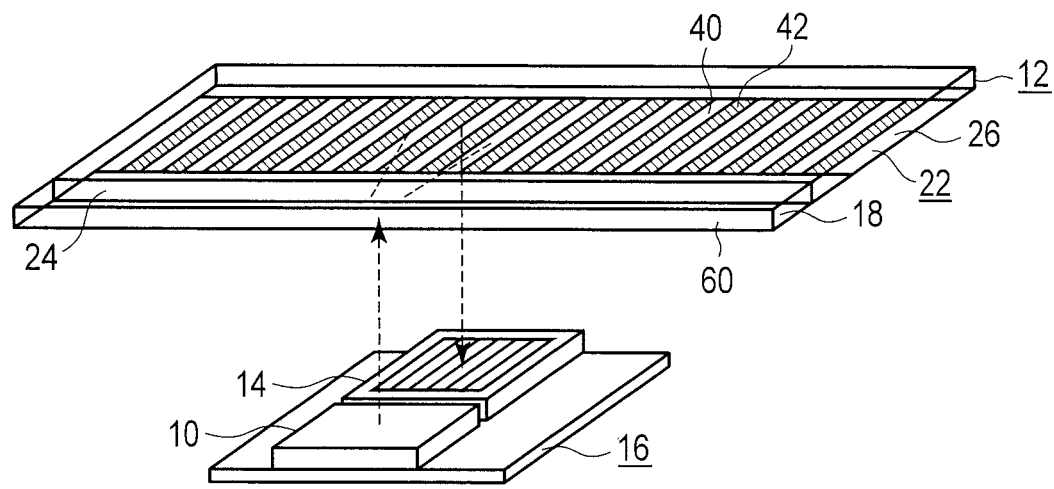
FIG. 10 is a perspective view showing an entire configuration of an optical encoder according to Modification 1 of the first embodiment.

As shown in FIG. 10, a diffusion member or a fluorescent member 60 may be used for at least a part of the scale 12.

For example, when a laser beam source is used as a light source serving as the light projecting portion 10, light does not diffuse, and hence the light can efficiently enter the light incidence portion 18. However, a major part of the incident light is reflected on a reflection surface and again exits from the light incidence portion 18. Therefore, when the incident light is diffused by the diffusion member or allowed to fluoresce by the fluorescent member, a part of the light travels toward the light exit portion 22, and hence the light can be guided in the scale 12.

[Modification 2]

Figure 11:
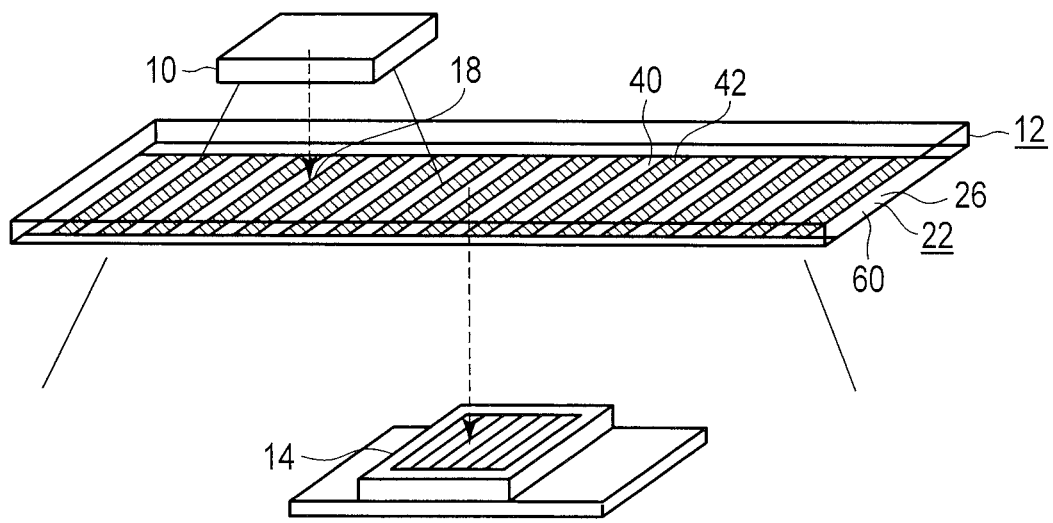
FIG. 11 is a perspective view showing an entire configuration of an optical encoder according to Modification 2 of the first embodiment.

As shown in FIG. 11, in regard to positions of the light projecting portion 10 and the light receiving portion 14, these portions may be arranged to sandwich the scale 12. At this time, the light incidence portion 18 of the scale 12 is provided on the surface on the side where the light projecting portion 10 is arranged, and the light exit portion 22 is arranged on the surface on the side where the light receiving portion 14 is arranged.

That is, in a configuration where the light projecting portion and the light receiving portion sandwich the scale, the light receiving portion must be installed at a position which is the same as an axis of the light exiting from the light projecting portion or a position at which the light can be received at least near the axis of the light from the light projecting portion in conventional examples. On the other hand, in this Modification 2, when the light is guided in the scale 12, the axis of the light that has been projected by the light projecting portion 10 and has entered the light incidence portion 18 is moved to a different position, and the light can be allowed to exit from the light exiting portion 22. Therefore, the light receiving portion 14 can be arranged on the moved axis of the light. That is, a degree of freedom in design can be increased for the arrangement of the light projecting portion 10 and the light receiving portion 14 with respect to the scale 12. Further, when the degree of freedom in design is increased for the arrangement of the light projecting portion 10 and the light receiving portion 14 with respect to the scale 12, a reduction in thickness of the optical encoder can be realized.

[Modification 3]

Figure 12:
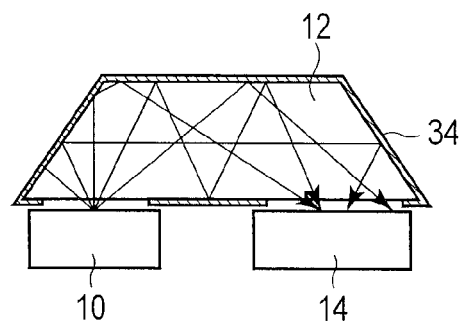
FIG. 12 is a view showing an example of a cross section of a scale, a light projecting portion, and a light receiving portion in an optical encoder according to Modification 3 of the first embodiment.

As shown in FIG. 12, an angle is provided to a reflection surface (the reflection member 34) of the scale 12 in such a manner that light from the light incidence portion 18 can travel in a direction of the light exit portion 22. As different from the regular optical design, a specific light path is not assumed between the light incidence portion 18 and the light exit portion 22 as a light path according to this Modification 3. Alternatively, simultaneous presence of light paths is assumed. Therefore, as reflection in the scale 12, multiple reflection including single reflection is mainly assumed. As the multiple reflection, there are assumed a situation that a specific number of times, which is not less than one, of reflection alone occur and a situation that different numbers of times, which are not less than one, of reflection simultaneously occur. As the reflection contributing to detection, a specific number of times of reflection, e.g., single reflection may have high gravity.

As a result, the light from the light incidence portion 18 can be further efficiently guided to the light exit portion 22.

Further, since a specific light path is not assumed between the light incidence portion 18 and the light exit portion 22 or simultaneous presence of light paths is assumed, even if a positional relationship between the scale 12, the light projecting portion 10, and the light receiving portion 14 deviates from a design value, a change in amount of light received by the light receiving portion 14 is smaller than that in a situation that a specific light path is assumed, thereby obtaining a stable output.

Figure 13:
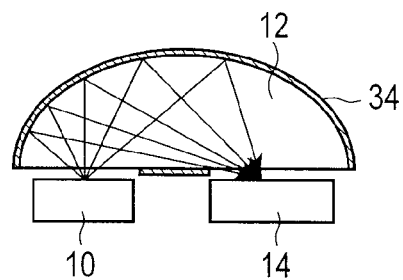
FIG. 13 is a view showing still another example of the cross section of the scale, the light projecting portion, and the light receiving portion in the optical encoder according to Modification 3.
Figure 14:
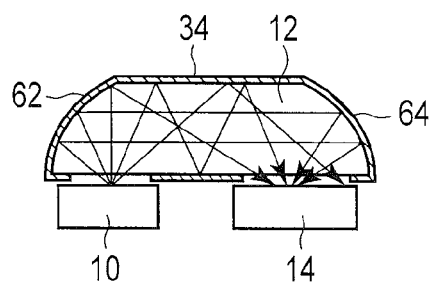
FIG. 14 is a view showing yet another example of the cross section of the scale, the light projecting portion, and the light receiving portion of the optical encoder according to Modification 3.

It is to be noted that the angle is provided on the reflection surface which is a flat surface in FIG. 12, but the reflection surface may be a curved surface or a surface having any other shape as long as the light can be efficiently guided. For example, like FIG. 13, a cross section of the scale may have a shape taken along a major axis of an ellipse, and the light incidence portion 18 and the light exit portion 22 may be provided on focal points of the ellipse. As a result, the light that has entered the light incidence portion 18 is reflected on the reflection member 34 of the scale 12 and condensed on the light exit portion 22, and hence a major part of the incident light travels toward the light exit portion 22, thus enhancing the light guiding efficiency. Furthermore, since the light is condensed by the single reflection alone, extreme attenuation can be suppressed and the light can be guided even if the reflection member 34 has a low reflectance ratio. Moreover, as shown in FIG. 14, a first reflection curved surface 62 may be provided to reflect a part of the light, which has entered the light incidence portion 18, from the light incidence portion 18 in a direction parallel to the direction of the light exit portion 22, and a second reflection curved surface 64 may be provided to condense the light, which has been guided in parallel, onto the light exit portion 22. As a result, the number of times of reflection for a part of the light can be reduced, and the light guiding efficiency can be improved.

Second Embodiment

Figure 15:
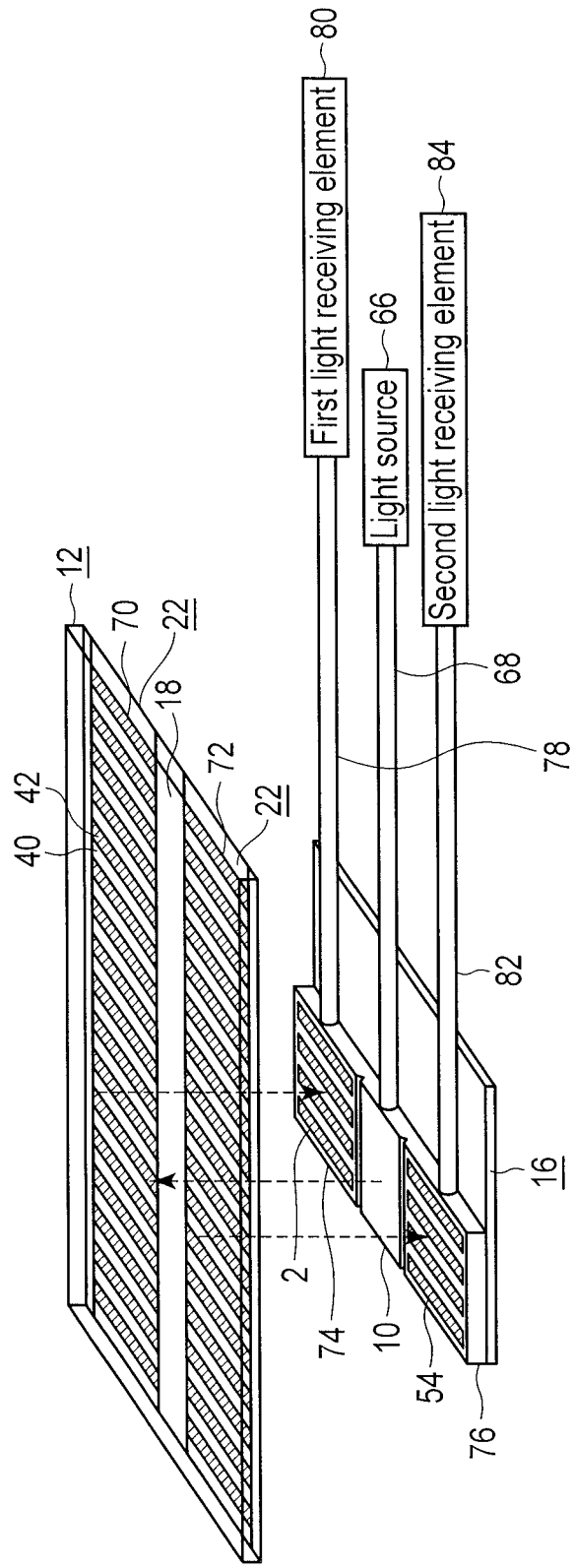
FIG. 15 is a perspective view showing an entire configuration of an optical encoder according to a second embodiment of the present invention.

An optical encoder according to a second embodiment of the present invention will now be described with reference to FIG. 15.

The optical encoder according to this second embodiment is different from the optical encoder according to the first embodiment in the following contents. That is, in this embodiment, a light source 66 is placed at a position apart from the scale 12. Light from the light source 66 is guided by a light projecting portion light guiding member 68, and it is projected from the light projecting portion 10 toward the scale 12. Patterns of the scales 12 are provided in two columns (first scale-side transmission slits 70, second scale-side transmission slits 72) to sandwich the light incidence portion 18. A light receiving portion is provided to each of the two columns of the scale-side transmission slits 70 and 72. That is, a first light receiving portion 74 is provided in association with the first scale-side transmission slits 70, and a second light receiving portion 76 is provided in association with the second scale-side transmission slits 72. Moreover, light received by the first light receiving portion 74 is guided to a first light receiving element 80 placed at a position away from the scale 12 through a first light receiving portion light guiding member 78, and it is received by the first light receiving element 80. Likewise, light received by the second light receiving portion 76 is guided to a second light receiving element 84 placed at a position away from the scale 12 through a second light receiving portion light guiding member 82, and it is received by the second light receiving element 84.

Parts different from the optical encoder according to the first embodiment alone will be described hereinafter in detail.

In this embodiment, the light source 66 such as an LED or an LD is provided at a position away from the scale 12. An end portion of the light projecting portion light guiding member 68 which is an optical fiber is connected to an exit portion of the light source 66. The other end portion of the light projecting portion light guiding member 68 is connected to the light projecting portion 10. The light projecting portion 10 is disposed on the fixed body (not shown), and it is in contact with or in proximity to the light incidence portion 18 of the scale 12. It is to be noted that FIG. 15 shows a state that a light projecting surface of the light projecting portion 10 is apart from the scale 12 for the purpose of illustration. The light projecting portion 10 allows the light, which has been guided from the light source 66 by the light projecting portion light guiding member 68, to exit in the direction of the scale 12 using, e.g., a reflection member. When the light from the light source 66 is guided through the optical fiber in this manner, the light can be guided even if a position of the light source 66 is changed with respect to the light projecting portion 10 or a change in a path between the light source 66 and the light projecting portion 10, e.g., curvature occurs.

As the scale-side transmission slits of the scale 12, the two columns of the first scale-side transmission slits 70 and the second scale-side transmission slits 72 are provided to sandwich the light incidence portion 18. At least a part of light that has entered from the light incidence portion 18 is guided to each of the first scale-side transmission slits 70 and the second scale-side transmission slits 72 by the light guiding portion 24, and the light exits from the respective light exit portions 22.

The first light receiving portion 74 and the second light receiving portion 76 are disposed on the fixed body (not shown). The first light receiving portion 74 and the second light receiving portion 76 are in contact with or in proximity to the first scale-side transmission slits 70 and the second scale-side transmission slits 72, respectively. The rectangular first and second head-side transmission slits 50 and 52 formed of light shielding portions and light transmitting portions are provided on the light receiving surfaces of the first and second light receiving portions 74 and 76 at the same intervals and in the same directions as the first and second scale-side transmission slits 70 and 72. The first head-side transmission slits 50 and the second head-side transmission slits 52 are arranged in every ¼ cycle, i.e., at every 90°.

Additionally, end portions of the first and second light receiving portion light guiding members 78 and 82 formed of optical fibers are connected to the first and second light receiving portions 74 and 76. The first and second light receiving portions 74 and 76 allow the light from the scale 12 to enter the first and second light receiving portion light guiding members 78 and 82 using, e.g., reflection members, respectively. The other end portions of the first and second light receiving portion light guiding members 78 and 82 are connected to the light receiving surfaces of the first and second light receiving elements 80 and 84 such as PDs installed at positions apart from the scale 12. As a result, the lights guided by the first and second light receiving portion light guiding members 78 and 82 are received by the first and second light receiving elements 80 and 84. When the lights from the first and second light receiving portions 74 and 76 are guided through the optical fibers in this manner, the light can be guided even when the positions of the first and second light receiving elements 80 and 84 with respect to the first and second light receiving portions 74 and 76 are changed or paths between the first and second light receiving portions 74 and 76 and the first and second light receiving elements 80 and 84 are changed, e.g., curved.

Amounts of lights received by the first and second light receiving elements 80 and 84 are changed in accordance with a positional relationship between the first and second scale-side transmission slits 70 and 72 of the scale 12 and the slits of the first and second light receiving portions 74 and 76, and pseudo-sinusoidal waves can be obtained. Additionally, since patterns of the first and second light receiving portions 74 and 76 are shifted at every 90°, signals that are shifted at every 90° can be likewise obtained from the pseudo-sinusoidal waves (FIG. 8). Based on this change in pseudo-sinusoidal wave signals, a relative movement amount and a displacement direction of the fixed body and the movable body can be detected.

It is to be noted that the head-side transmission slits 50 and 52 and the scale-side transmission slits 70 and 72 may be provided on the light projecting surface of the light projecting portion 10 and the light incidence portion 18 of the scale 12, respectively.

Further, although the description has been given as to the example where the head 16 constituted of the light projecting portion 10 and the light receiving portions 74 and 76 is disposed on the fixed body and the scale 12 is disposed on the movable body, the scale 12 may be disposed on the fixed body, and the head 16 constituted of the light projecting portion 10 and the light receiving portions 74 and 76 may be disposed on the movable body.

Furthermore, although the configuration of the slits whose phases are 90° different has been described, the present invention is not restricted to 90°, and an arbitrary phase difference may be set.

It is to be noted that the description has been given as to the configuration that the slits 70 and 72 of the scale 12 are of the transmission type but, as a matter of course, the present invention is not restricted to the transmission type, and the reflection type can be adopted.

Moreover, the scale-side transmission slits 70 and 72, the light incidence portion 18, the light guiding portion 24, and the light exit portion 22 do not have to be integrated with each other, and they may be separated from each other as long as they are configured to effect the same relative movement with respect to the light receiving portion 14.

Additionally, although the description has been given as to the example where the light projecting portion 10 and the light receiving portions 74 and 76 are integrated as the head 16, the light projecting portion 10 may be separated from the light receiving portions 74 and 76 as long as the scale 12 is disposed on one of the fixed body and the movable body and the light receiving portions 74 and 76 are disposed on either the fixed body or the movable body on which the scale 12 is not disposed. A position of the light projecting portion 10 may be independently changed as long as the light projecting portion 10 is placed at a position where it allows the light to enter the light incidence portion 18 of the scale 12.

According to the optical encoder of the second embodiment of the present invention described above, the light from the light source 66 is guided by the light projecting portion light guiding member 68 and projected from the light projecting portion 10, and the light received by the light receiving portions 74 and 76 are guided by the light receiving portion light guiding members 78 and 82 and received by the light receiving elements 80 and 84. With such a configuration, even if electromagnetic noise is produced at the fixed body which is the measurement position and around the movable body, the light alone is detected in the fixed body and the movable body, and hence the measurement can be performed while being hardly affected by the electromagnetic noise.

Further, with one or both of the configuration that the light from the light source 66 is guided by the light projecting portion light guiding member 68 and projected from the light projecting portion 10 and the configuration that the light received by the light receiving portions 74 and 76 is guided by the light receiving portion light guiding members 78 and 82 and received by the light receiving elements 80 and 84, the number of electronic components can be reduced or such electronic components are not mounted at the measurement position. As a result, heat generation due to the electronic components at the measurement position can be reduced, thereby alleviating influence of the heat generation on the periphery.

As a modification of this second embodiment, portions different from the optical encoder according to the second embodiment alone will be described.

[Modification]

Figure 16:
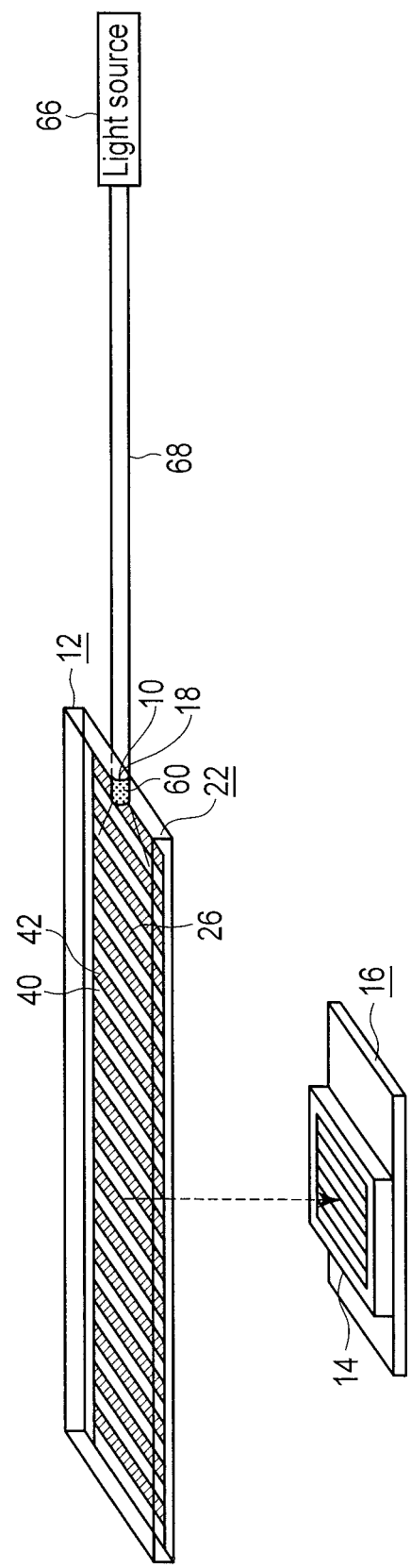
FIG. 16 is a perspective view showing an entire configuration of an optical encoder according to a modification of the second embodiment.

The light projecting portion 10 and the light incidence portion 18 may be configured on the side surface of the scale 12. FIG. 16 shows an example that the light projecting portion light guiding member 68 formed of an optical fiber allows light from the light source 66 to enter the side surface of the scale 12. An end portion of the light projecting portion of light guiding member 68 connected to the scale 12 serves as the light projecting portion 10, and the side surface of the scale 12 connected with the light projecting portion 10 serves as the light incidence portion 18. To enhance the incidence efficiency of light with respect to the optical fiber or perform stable light guiding in the fiber, it is very effective to use a laser beam for the light source 66. When the light from the light source 66 is guided through the optical fiber, the light can be guided even though a position of the light source 66 with respect to the light projecting portion 10 changes or a path between the light source 66 and the light projecting portion 10 is changed, e.g., curved. Further, since the light source 66 is directly connected to the scale 12 through the optical fiber, leakage of the light on the way is extremely reduced, and the incidence efficiency is improved. Obviously, as the light projecting portion light guiding member 68, a light guiding member other than the optical fiber may be used as long as the light can be guided from the light source 66 to the scale 12.

At this moment, the diffusion member or the fluorescent member 60 may be used for at least a part of the scale 12 to diffuse the light so that a part of the diffused light can travel toward the light exit portion 22. For example, when the light from the light projecting portion 10 is a laser beam, it can be considered that the light travels straight ahead even in the scale 12 and an amount of the light that exits from the light exit portion 22 is small. Therefore, diffusion using the diffusion member or fluorescence using the fluorescent member is carried out, a part of the light can exit from the light exit portion 22. Further, in particular, in case of using the fluorescent member, combining this member with the laser beam enables improving the efficiency of fluorescence.

It is to be noted that the example using the optical fiber has been described, but if the path from the light source 66 to the scale 12 is restricted to, e.g., a straight line, the light from the light source 66 may be projected to the side surface of the scale 12 directly without using the light guiding member or through an optical system such as a lens.

Alternatively, in place of directly connecting the optical fiber to the scale 12, an end portion of the optical fiber on the scale 12 side may be used as the light projecting portion 10 so that the light exiting from the light projecting portion 10 can be projected onto the side surface of the scale 12 directly or through the optical system, e.g., a lens. At this time, a position of the light projecting portion 10 may be independently changed as long as the light projecting portion 10 is placed at a position enabling the light to enter the light incidence portion 18 of the scale 12.

According to such a modification, when the light directly enters the scale 12, the light projecting portion 10 does not have to be provided to the head 16, and the head 16 can be reduced in size.

Although the present invention has been described with reference to the embodiments, the present invention is not restricted to the foregoing embodiments and, as a matter of course, the present invention can be modified or applied in many ways within the range of the gist thereof.

(Additional Remarks)

The inventions having the following structures as well as the invention described in claims can be extracted from the specific embodiments.

(1) The optical encoder according to claim 5, wherein the function of improving the light incidence efficiency is achieved by roughening the light incidence portion on the scale surface.

(2) The optical encoder according to claim 5, wherein the function of improving the light incidence efficiency is achieved by providing a matching member (30) which has a refractive index equivalent to refractive indexes of the light projecting portion and the scale between the light projecting portion and the light incidence portion.

(3) The optical encoder according to claim 5, wherein the function of improving the light guiding efficiency is achieved by providing a reflection member (34) on the scale surface of the light guiding portion.

(4) The optical encoder according to claim 5, wherein the function of improving the light guiding efficiency is achieved by providing a diffraction grating (36) to the light incidence portion.

(5) The optical encoder according to claim 5, wherein the function of improving the light exit efficiency is achieved by roughening the light exit portion on the scale surface.

(6) The optical encoder according to claim 5, wherein the function of improving the light exit efficiency is achieved by providing a matching member (30) which has a refractive index equivalent to refractive indexes of the light receiving portion and the scale between the light receiving portion and the light exit portion.

(7) The optical encoder according to claim 5, wherein the function of improving the light exit efficiency is achieved by a diffraction grating to the light exit portion.

(8) An optical encoder comprising: a head portion (16) which has a light projecting portion (10), a light receiving portion (14; 74, 76), and head-side transmission slits (52 to 58); and a scale (12) which is relatively displaced with respect to the head portion, the scale comprising: a light incidence portion (18) to which light from the light projecting portion enters; a light exit portion (22) from which the light from the light incidence portion exits; a light guiding portion (24) having a light guiding function; and scale-side transmission slits (26), the optical encoder outputting a periodic signal associated with relative displacement of the head portion and the scale based on the light which has been projected from the light projecting portion and detected by the light receiving portion through the light guiding portion, wherein the light projecting portion is arranged in such a manner that a light projecting surface thereof is in contact with or in proximity to the light incidence portion, the light receiving portion is provided at a position apart from the light projecting portion at a predetermined interval on the same side as the light projecting portion with respect to the scale in a direction perpendicular to a measurement direction of a relative position and thickness direction of the scale, and a light receiving surface of the light receiving portion is arranged in contact with or in proximity to the light exit portion, the light projecting surface of the light projecting portion and the light receiving surface of the light receiving portion are arranged on the same plane, the scale has a plate-like shape, the light incidence portion and the light exit portion have a length which is equivalent to at least a measurement range in the measurement direction of the relative position, the light guiding portion has reflection surfaces on a surface facing the head portion and a surface opposite to the head portion at least between the light incidence portion and the light exit portion, the scale is arranged in parallel with the light projecting surface of the light projecting portion and the light receiving surface of the light receiving portion, the head-side transmission slits and the scale-side transmission slits have fixed periods on a rectangular surface through which light is transmitted and a rectangular surface which blocks the light in the measurement direction, the fixed periods of the head-side transmission slits being equal to those of the scale-side transmission slits, the head-side transmission slits and the scale-side transmission slits are formed on the light projecting portion and an opposed surface of the light incidence portion or arranged to be adjacent or in proximity to the light projecting portion and the light incidence portion, respectively, or the head-side transmission slits and the scale-side transmission slits are formed on the light receiving portion and an opposed surface of the light exit portion or arranged to be adjacent to or in proximity to the light receiving portion and the light exit portion, the light projecting portion projects the light toward the light incidence portion of the scale, the light incidence portion allows the light from the light projecting portion to enter itself;

at least a part of the light is guided to the light exit portion using a reflection surface of the light guiding portion based on multiple reflection, the light exit portion allows the light guided by the light guiding portion to exit toward the light receiving portion;

the light receiving portion receives the light that has exited from the light exit portion, and when a relative position of the head-side transmission slits and the scale-side transmission slits changes between the light incidence portion and the light projecting portion or between the light exit portion and the light receiving portion, an amount of light detected by the light receiving portion through the head-side transmission slits and the scale-side transmission slits fluctuates, and a periodic signal associated with relative displacement of the head portion and the scale is output based on the fluctuation of the amount of light.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical encoder comprising: a light projecting portion; a light receiving portion; and a scale arranged between the light projecting portion and the light receiving portion, wherein the scale comprises a light guiding portion which allows light to transmit therethrough and has a light guiding function of guiding at least a part of the light projected by the light projecting portion in a direction perpendicular to a thickness of the light guiding portion through the light guiding portion, wherein the light guiding portion comprises reflection surfaces that are opposite each other across the thickness of the light guiding portion and the light is transmitted through a first surface of the light guiding portion and through the light guiding portion by reflecting a plurality of times off of the reflection surfaces, wherein the light reflected by the reflection surfaces the plurality of times travels along one of a plurality of undefined light paths, and the light receiving portion receives the light guided by the scale and relatively moves with respect to the scale, and the light receiving portion receives the light through the first surface of the light guiding portion.

2. The optical encoder according to claim 1,
wherein the scale has a function of moving an optical axis of the light projected by the light projecting portion based on the light guiding function.

3. The optical encoder according to claim 1 or 2,
having a light transmission efficiency improving function of efficiently transmitting the light emitted from the light projecting portion to the light receiving portion.

4. The optical encoder according to claim 3,
wherein the scale comprises:
a light incidence portion which allows the light from the light projecting portion to enter the scale;
a light exit portion which allows the incident light to exit from the scale toward the light receiving portion; and
the light guiding portion which guides at least a part of the light that has entered the light incidence portion in the direction perpendicular to the thickness of the light guiding portion, and guides the light to the light exit portion.

5. The optical encoder according to claim 4,
wherein, as the light transmission improving function, the optical encoder has at least one of:
a function of improving light incidence efficiency with respect to the inside of the scale between the light projecting portion and the light incidence portion;
a function of improving the light guiding efficiency by the light guiding portion; and
a function of improving the light exit efficiency with respect to the outside of the scale between the light exit portion and the light receiving portion.

6. The optical encoder according to claim 4,
wherein the light guiding portion guides the light based on at least one of reflection on an inner surface of the scale, and diffusion and fluorescence which occur due to a member present in the light guiding portion.

7. The optical encoder according to claim 1, further comprising:
a light projecting portion light guiding member which has one end portion connected to the light projecting portion and the other end portion connected to a light source,
wherein light emitted from the light source is guided by the light projecting portion light guiding member and projected from the light projecting portion.

8. The optical encoder according to claim 1, further comprising:
a light receiving portion light guiding member which has one end portion connected to the light receiving portion and the other end portion connected to a light receiving element, wherein light received by the light receiving portion is guided by the light receiving portion light guiding member and received by the light receiving element.

9. The optical encoder according to claim 1, further comprising:
a light projecting portion light guiding member which has one end portion connected to the light projecting portion and the other end portion connected to a light source; and
a light receiving portion light guiding member which has one end portion connected to the light receiving portion and the other end portion connected to a light receiving element,
wherein light emitted from the light source is guided by the light projecting portion light guiding member and projected from the light projecting portion, and
light received by the light receiving portion is guided by the light receiving portion light guiding member and received by the light receiving element.

10. The optical encoder according to claim 1,
wherein the light projecting portion and the light receiving portion are arranged in contact with the scale.

11. The optical encoder according to claim 1,
wherein the light projecting portion allows the light to enter from a side surface of the scale, the side surface of the scale being a surface along the thickness of the scale between the reflection surfaces.

12. The optical encoder according to claim 1,
wherein the scale has homogeneous reflection surfaces.

13. The optical encoder according to claim 12,
wherein the reflection surface is a parallel plate.

14. The optical encoder according to claim 12,
wherein at least a part of one of the reflection surfaces has a curved surface that improves the light guiding efficiency of the light guiding portion with respect to a traveling direction of the light from the light emitting portion.

15. The optical encoder according to claim 1, wherein the light receiving portion is comprised of a plurality of photodiodes.

16. The optical encoder according to claim 15, wherein the plurality of photodiodes are arranged in a pattern at every ¼ of a cycle of the scale.

* * * * *